May 20, 1930.  C. D. STEEL  1,759,287
PUMP FOR INFLATING PNEUMATIC TIRES
Filed Feb. 14, 1929  2 Sheets-Sheet 1
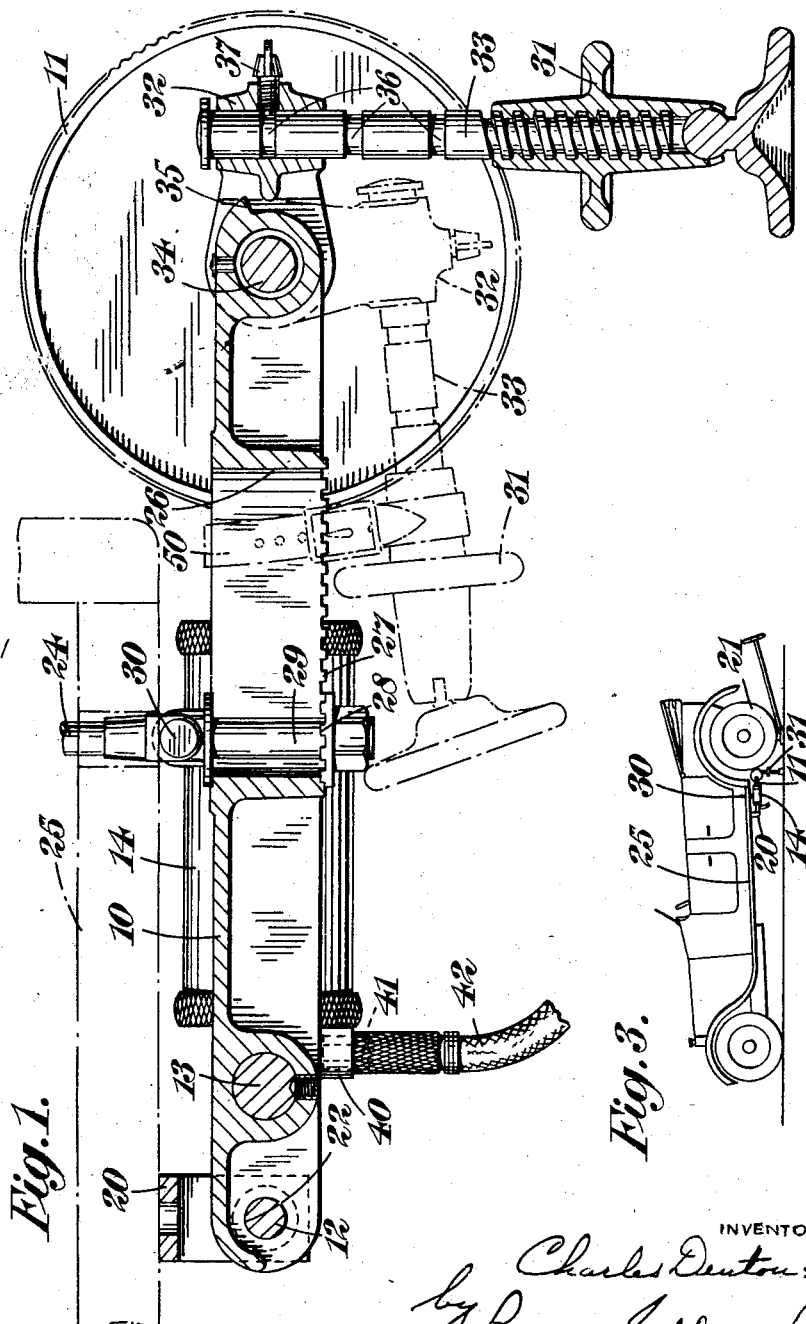

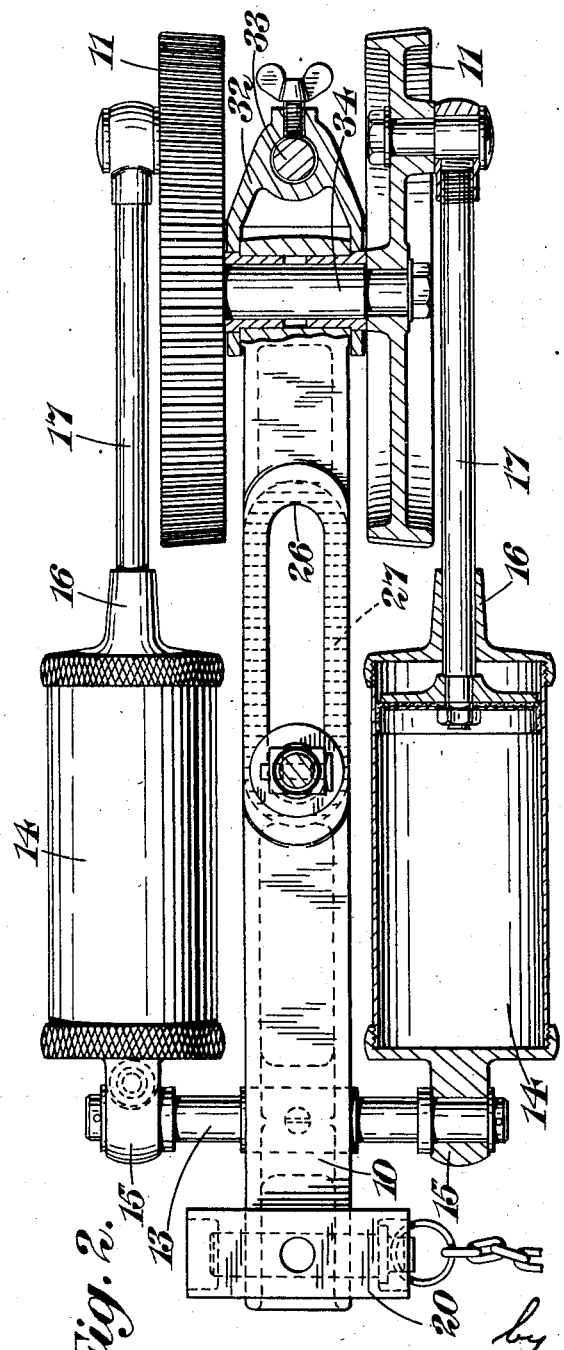

Patented May 20, 1930

1,759,287

UNITED STATES PATENT OFFICE

CHARLES DENTON STEEL, OF LONDON, ENGLAND

PUMP FOR INFLATING PNEUMATIC TIRES

Application filed February 14, 1929, Serial No. 339,889, and in Great Britain June 18, 1928.

This invention relates to power-driven pumps for inflating pneumatic tires on a motor-driven vehicle of the kind wherein a friction disc on the pump is arranged to be driven by a road wheel which has been raised off the ground and is driven by the engine.

The invention has for its object to provide an improved construction of pump of the kind referred to which can be readily brought into use and detached, as required, and which obviates the use of manual power for holding the friction disc in driving engagement with the road wheel.

According to the invention, there is provided the combination of a power-driven pump for inflating pneumatic tires on a motor-driven vehicle, pivotally detachable to the vehicle at or towards one end thereof, driving means comprising one or more friction discs (e. g. a pair thereof) to be frictionally driven by a road wheel of the vehicle, and means for swinging the pump about its pivotal attachment towards the road wheel to press the one or more friction discs into driving contact therewith. It is thus only necessary to jack up the end of the vehicle, press the friction wheels into contact with a road wheel, and start the engine running, when the pump can be driven frictionally from one of the road wheels and used for inflating the tires of the other road wheels.

According to a feature of the invention, the means for swinging the pump about its pivotal attachment is a lifting jack that may be mounted to swing about the axis of rotation of the said one or more friction discs from an operative position in which it can rest on the ground into an inoperative position, in which it can be held by any convenient means.

Conveniently, the pump with its driving means is arranged to be mounted to turn substantially in the vertical plane of the driving road wheel about a pivot journalled in a bracket fixed to the underside of the running board.

Other features of the invention are described hereinafter and pointed out in the claims.

One embodiment of the invention is diagrammatically illustrated by way of example in the accompanying drawings, wherein:—

Figure 1 is a vertical longitudinal section through a pump and driving means therefor according to the invention;

Figure 2 is a bottom plan view of the pump shown in Figure 1, some parts being omitted, and Figure 3 is a side elevation of a motor vehicle having applied to it the pump shown in Figures 1 and 2.

Like reference characters designate like parts throughout the several views.

Referring first to Figures 1 and 2, the frame of the pump is a casting 10 in the form of a bar of substantially rectangular section about one foot long but channelled at intervals to reduce its weight. This bar 10 has a pair of friction discs 11 each in the form of a disc crank at one end, and at the other end a hole 12 parallel with the axis of rotation of the discs. A short horizontal shaft 13 is carried in the frame at the latter end near said hole, and parallel therewith. Two pump cylinders 14 each having a plunger are arranged one at each side of the frame. These cylinders are journalled at one end on the shaft 13 as shown at 15, and have their other ends provided each with a sleeve 16 constituting a long bearing, through which the rod 17 of the plunger extends to a disc crank 11.

A bearing bracket 20 of inverted U-section is provided for permanent attachment by a bolt or otherwise to the underside of the running board adjacent a rear road wheel 21 of a motor-driven vehicle as indicated in Figure 3, and a pivot-pin 22 carried by the bracket 20 and passing through the hole 12 in the frame serves to mount the pump on the running board so that it can swing in the vertical plane of the road wheel 21 to bring the friction discs 11 into and out of engagement with the latter.

At a situation on the frame between the shaft 13 and the friction discs 11 is pivoted one end of a screwthreaded rod 24 intended to be passed from below through a hole in the running board 25 of the vehicle. As illustrated the middle of the bar 10 has a vertical slot 26 whereof the side walls have teeth 27 on their lower edges with which engages a castellated washer 28 on the bottom of a bolt 29, to the upper end of which the rod 24 is pivoted, as shown at 30, so that the distance of the rod 24 from the shaft 13 can be readily varied by shifting the bolt 29 along the slot 26. As shown in Fig. 3, the upper end of this rod 24 may carry above the running board 25 a coil spring 38 situated between two washers, and a winged nut 39 above the latter, so that by screwing the latter down the rod 24 the frame 10 can be rocked about its pivot 22 to bring the discs 11 into driving engagement with the road wheel serving to drive it.

Instead of or as well as using the rod 24 for moving the pump towards the road wheel to press the friction discs into driving contact with the road wheel any other convenient means, such as a lifting jack 31, may be provided for the same purpose. As illustrated, a bracket 32 threaded on the spindle 33 of the manually operatable screw jack 31 is pivoted to swing vertically about the axle 34 of the discs 11, a stop 35 being provided on the end of the frame 10 for limiting the upward movement of the jack towards the road wheel. The spindle 33 has in its periphery several grooves 36 into which a set screw 37 movable in the bracket 32 can enter for rapidly varying the operative length of the jack without turning its handwheel. When the jack is not in use it may be laid alongside the frame 10, as shown in broken lines in Figure 1, and be tied to the frame by a strap 50 or the like.

When the rod 24 is provided in addition to the lifting jack the rod 24 may serve to hold the pump in an inoperative position below the running board when the pump is not in use, and prevent it from swinging downwards about the pivot 22 so far as to come in contact with the ground.

Each cylinder 14 may have at its end remote from the friction discs 11 a downwardly-directed delivery tube 40 provided with a check-valve 41 for connection each to one branch tube 42 of two such tubes provided at one end of a flexible tube that can be connected at its other end to the tire to be inflated.

The described double-barrelled pump can be readily attached to and detached from a motor-car of any desired construction without interfering in any way with the mechanical construction of the car, the only alteration being the addition of the bearing bracket 20 on the underside of the running board and a hole in the latter for the rod 24. The pump can be placed in position on the running board in a very short time and after it has been jacked up, or brought by the rod 24 into driving engagement with an inflated road wheel, and the engine has been started with the end of the car jerked up off the ground, it will pump up a pneumatic tire of the largest size in a short time. When the pump is in use the engine and parts driven thereby run in the ordinary manner and are not subjected to any unusual stresses differing from those set up under ordinary running conditions.

I claim:

1. In a pump, the combination of a cylinder, a piston therein, driving means for the piston comprising at least one friction disc to be frictionally driven by a road wheel of a vehicle, a movable supporting frame arranged to be pivotally mounted for engaging the disc with the road wheel, and lifting means arranged to bear on the ground and move the frame about its axis of pivoting towards the said road wheel to press the one or more friction discs into driving contact therewith.

2. In a pump, the combination of a cylinder, a piston therein, driving means for the piston comprising at least one friction disc to be frictionally driven by a road wheel of a vehicle, a movable supporting frame arranged to be pivotally mounted at one end for engaging the disc or discs with the road wheel, and a lifting jack attached to said frame at a situation lying towards the other end thereof for swinging the frame about its axis of pivoting towards the said road wheel to press the one or more friction discs into driving contact therewith.

3. In a pump, the combination of a cylinder, a piston therein, driving means for the piston comprising at least one friction disc to be frictionally driven by a road wheel of a vehicle, a movable supporting frame arranged to be pivotally mounted for engaging the disc with the road wheel, and a lifting jack pivotally attached to said frame to swing about the axis of rotation of the friction disc or discs, and arranged to swing the frame about its axis of pivoting towards the said road wheel to press the one or more friction discs into driving engagement therewith.

In testimony whereof I affix my signature.

CHARLES DENTON STEEL.